T. R. FONDREN.
CHECK VALVE FOR LOCOMOTIVE BOILERS AND THE LIKE.
APPLICATION FILED MAR. 19, 1907.
940,453.
Patented Nov. 16, 1909.
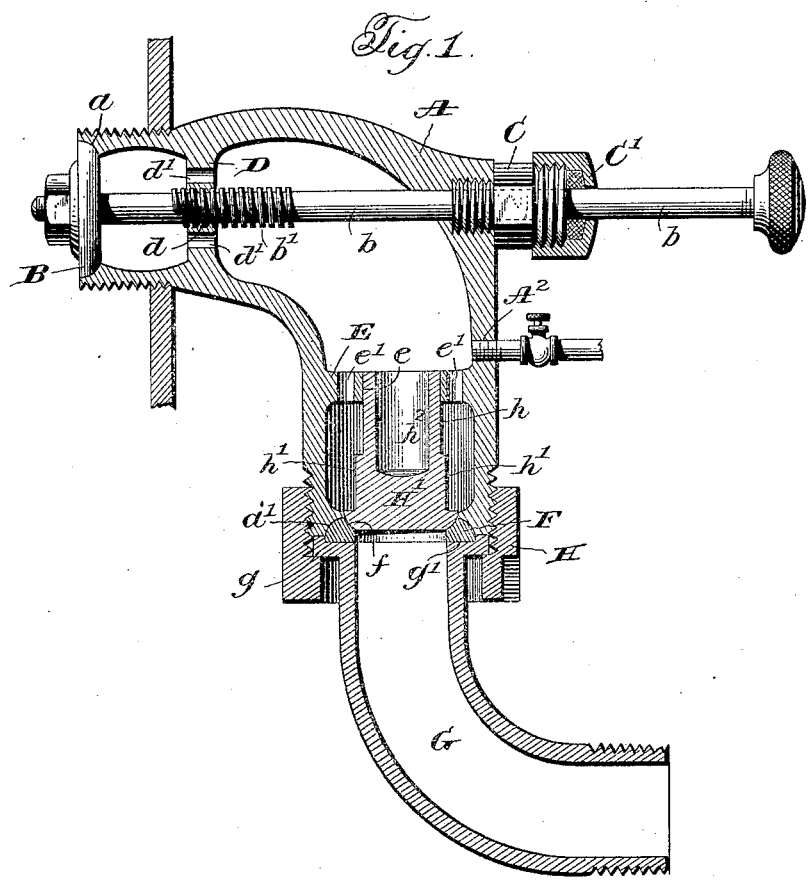
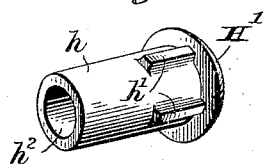
Witnesses:
Jas. E. Hutchinson
Marshall L. Faber
Inventor:
Theodore R. Fondren,
By John M. Spellman Attorney

UNITED STATES PATENT OFFICE.

THEODORE ROBERT FONDREN, OF LANCASTER, TEXAS.

CHECK-VALVE FOR LOCOMOTIVE-BOILERS AND THE LIKE.

940,453. Specification of Letters Patent. Patented Nov. 16, 1909.

Application filed March 19, 1907. Serial No. 363,236.

*To all whom it may concern:*

Be it known that I, THEODORE ROBERT FONDREN, a citizen of the United States, residing at Lancaster, in the county of Dallas and State of Texas, have invented certain new and useful Improvements in Check-Valves for Locomotive-Boilers and the Like, of which the following is a specification.

This invention relates to an improvement in check valves particularly adapted for use on locomotive boilers and the object of the invention is the provision of a check valve and its seat which are so secured in a suitable fitting that they may be at any time readily removed for the purpose of grinding without the necessity of running off the water from the boiler.

A further object of the invention is the provision of a cut off valve interposed between the check valve and boiler, which valve is positioned within the boiler so as to prevent freezing thereof.

A further object of the invention is the provision of a check valve which is so fashioned that it will at all times be held against any rocking movements on its seat.

Other objects of the invention will be apparent from the detailed description hereinafter, when read in connection with the accompanying drawings forming a part hereof, wherein like characters of reference refer to similar parts in the several views, and wherein a preferable embodiment of my invention is shown.

In the drawings: Figure 1 is a sectional view showing my improved fitting secured to a boiler with the cut-off and check valve therein. Fig. 2 is a perspective view of the improved check valve.

Referring now more particularly to the drawings, A designates an elbow fitting, one end of which is designed to be threaded or otherwise rigidly secured into one of the walls of the boiler so as to establish a communication with the interior thereof. The end of the elbow fitting projecting within the interior of the boiler is provided with a suitable valve seat $a$ with which is designed to coöperate a cut-off valve B. Extending from the valve B is a stem $b$, the outer end of which projects through a suitable bushing C, threaded into the fitting A and is provided with a suitable operating handle. The outer end of the bushing C is provided with a suitable stuffing box C' to prevent leakage around the valve stem. The valve stem $b$ is provided adjacent its connection with the valve B with a threaded portion $b'$ which works through a threaded opening $d$ in a wall D, which extends transversely of the fitting A adjacent the discharge end thereof and is preferably formed integral therewith. The wall D is provided with suitable openings $d'$ therein permitting the water to pass freely therethrough.

The fitting A is provided adjacent the inlet end thereof with a wall E extending transversely thereacross which is preferably formed integral therewith and is provided with a central circular opening $e$ positioned axially of the interior of the fitting and with a plurality of openings $e'$ surrounding the central opening to permit water to pass freely through said wall. The inlet end of the fitting A is provided with a dished portion $a'$ which constitutes a seat for a ring F, the outer edge of which conforms in configuration to said dished portion and the inner edge of which is dished as at $f$ to form a seat for the check valve to be hereinafter described.

G designates an elbow pipe which is designed to be connected to the inlet end of the elbow fitting A to connect the same to any suitable source of water supply. The elbow pipe G is slightly smaller in diameter than the elbow fitting A and is provided at the end which is designed to be secured to the elbow fitting A with a laterally extending flange $g$ of substantially the diameter of the fitting A. The flange $g$ is provided on its outer face with an annular recessed portion $g'$ in which is designed to rest the base of the annular ring or check valve seat F. The elbow pipe G is connected to the inlet end of the elbow fitting A by means of a collar H which is provided with a threaded portion which is adapted to engage with the threaded portion of the inlet end of the fitting A and with a flange extending inwardly from the lower end of said threaded portion which is designed to underlie the flange $g$ extending from the end of the coupling G. From this construction it will be apparent when the elbow pipe G is secured to the fitting A, the check valve seat F will be forced tightly into engagement with the inlet end of the elbow fitting A.

H designates a check valve which is somewhat smaller in diameter than the interior of the elbow fitting A to permit water to pass freely therearound, and the lower end of which is formed to snugly engage the dished portion $f$ of the ring F and form a tight joint therewith. The check valve H is provided with a cylindrical portion $h$ which snugly engages the circular aperture $e$ in the wall E in the elbow fitting A and with a plurality of ribs $h'$ which extend radially from the valve and the upper ends of which serve by contacting with the under side of the wall E to limit the upward movement of the valve. The check valve H is preferably provided with a cylindrical recess $h^2$ therein, the lower end of which extends in proximity to the lower end of said valve which insures the valve being normally held tightly to its seat by the pressure in the boiler. The elbow fitting A is provided just above the wall E with an opening $A^2$ in which is designed to be threaded or otherwise suitably secured a draw-off cock of any suitable construction so that after the cutoff valve has been closed any water above the check valve may be drawn off and access had to said valve and its seat.

From the above described construction, it will be apparent that both the check valve and its seat may be at any time removed without drawing off the water from the boiler. It will also be obvious that by reason of the fact that the cut off valve is positioned within the boiler, it will be impossible for said valve to freeze.

I do not desire to limit myself to the precise form and construction shown in the accompanying drawings as it is obvious that many minor changes may be made thereto without departing from the spirit of the invention as defined in the appended claim.

Having thus described the invention, what is claimed is:—

In combination with a boiler, an elbow fitting positioned without the boiler, comprising a horizontal branch projecting within the boiler and a vertical branch depending from the outer end of said horizontal branch, a cutoff valve adapted to close the end of the horizontal branch projecting within the boiler, said horizontal branch being provided adjacent the end extending within the boiler, with a wall extending transversely thereof having a central opening and a plurality of openings surrounding said central opening, and an operating rod secured to the cutoff valve, said rod having a threaded engagement with the central opening of said wall and extending without the fitting, said vertical branch being provided adjacent the lower end thereof with a wall extending transversely thereof having a central opening and a plurality of openings surrounding said central opening, a pipe adapted to be secured to the lower end of said fitting, a valve seat interposed between the adjacent ends of said fitting and pipe, and means for detachably clamping the pipe to the fitting and holding the valve seat in position, a check valve within said fitting and adapted to coöperate with said valve seat, said valve being provided with a portion snugly fitting the central opening in the transverse wall adjacent the lower end of the vertical arm of the fitting and a drain cock in the vertical branch above the check valve.

In testimony whereof I have signed my name to this specification in the presence of two subscribing witnesses.

THEODORE ROBERT FONDREN.

Witnesses:
E. V. HARDWAY,
WM. A. CATHEY.